US006074554A

United States Patent [19]
Ray et al.

[11] Patent Number: 6,074,554
[45] Date of Patent: Jun. 13, 2000

[54] AERATION SYSTEM

[75] Inventors: Robert B. Ray, Vancouver; Mark M. Oandil, Camas; Gary L. Olin, Beaverton, all of Wash.

[73] Assignee: Roper Holdings, Inc., Wilmington, Del.

[21] Appl. No.: 09/034,642

[22] Filed: Mar. 4, 1998

Related U.S. Application Data

[63] Continuation of application No. 08/953,850, Oct. 15, 1997, which is a continuation-in-part of application No. 08/540,255, Oct. 6, 1995, Pat. No. 5,591,001, and a continuation-in-part of application No. PCT/US96/15336, Sep. 24, 1996.

[51] Int. Cl.$^{7}$ .................................. C02F 1/24; B01F 5/12; B01F 5/16; F04D 31/00

[52] U.S. Cl. .......................... 210/194; 210/205; 210/220; 210/221.2; 261/28; 261/93; 415/116; 415/117

[58] Field of Search ............................. 210/221.2, 221.1, 210/220, 205, 194; 261/28, 93; 415/116, 117

[56] References Cited

U.S. PATENT DOCUMENTS

| | | |
|---|---|---|
| 1,460,982 | 7/1923 | Records . |
| 2,319,752 | 5/1943 | Smith et al. . |
| 2,772,234 | 11/1956 | Kelly . |
| 2,791,182 | 5/1957 | Scheidl . |
| 2,801,084 | 7/1957 | Krupp et al. . |
| 3,128,713 | 4/1964 | Nechine . |
| 3,175,687 | 3/1965 | Jones . |
| 3,642,617 | 2/1972 | Brink et al. . |
| 3,663,117 | 5/1972 | Warren . |
| 3,828,935 | 8/1974 | Rovel . |
| 3,846,299 | 11/1974 | Krasnoff . |
| 3,948,492 | 4/1976 | Hege . |
| 3,959,131 | 5/1976 | Ramirez et al. . |
| 4,022,696 | 5/1977 | Krofta . |
| 4,031,006 | 6/1977 | Ramirez et al. . |
| 4,184,967 | 1/1980 | Krofta . |
| 4,193,949 | 3/1980 | Naito . |
| 4,216,085 | 8/1980 | Chittenden . |
| 4,305,735 | 12/1981 | Kanak et al. . |
| 4,374,027 | 2/1983 | Severeid et al. . |
| 4,626,345 | 12/1986 | Krofta . |
| 4,681,682 | 7/1987 | White et al. . |
| 4,744,722 | 5/1988 | Sämpi et al. . |
| 4,780,051 | 10/1988 | Fisher, Jr. . |
| 4,921,604 | 5/1990 | Moellenbeck . |
| 4,923,600 | 5/1990 | Krofta . |
| 4,931,175 | 6/1990 | Krofta . |
| 5,064,531 | 11/1991 | Wang et al. . |
| 5,068,031 | 11/1991 | Wang et al. . |
| 5,069,783 | 12/1991 | Wang et al. . |
| 5,080,802 | 1/1992 | Cairo, Jr. et al. . |
| 5,084,165 | 1/1992 | Wang et al. . |
| 5,139,662 | 8/1992 | Ozawa . |
| 5,151,177 | 9/1992 | Roshanravan et al. . |
| 5,160,610 | 11/1992 | O'Reilly . |
| 5,188,729 | 2/1993 | Krofta . |
| 5,275,732 | 1/1994 | Wang et al. . |
| 5,306,422 | 4/1994 | Krofta . |
| 5,382,358 | 1/1995 | Yeh . |
| 5,385,443 | 1/1995 | Dufour . |
| 5,386,598 | 2/1995 | Mersmann . |
| 5,427,500 | 6/1995 | Hyll . |
| 5,489,187 | 2/1996 | Ray . |
| 5,693,222 | 12/1997 | Galvan et al. . |

*Primary Examiner*—Thomas M. Lithgow
*Attorney, Agent, or Firm*—Kolisch, Hartwell, Dickinson, McCormack & Heuser

[57] ABSTRACT

A system for dissolved air floatation treatment of a liquid stream where the system includes a pump having an impeller cavity with input and output ports, and an impeller with an eye disposed adjacent the input port. The impeller draws liquid through the input port and drives the liquid toward the output port and creates a subatmospheric pressure zone in the cavity away from the eye. The pump includes an air introduction port opening into the subatmospheric zone to introduce significant quantities of air into the cavity for mixing with the liquid stream. The system also includes a tank adapted to receive the liquid stream from the pump with dissolved air introduced therein.

13 Claims, 5 Drawing Sheets

AERATION SYSTEM

CROSS-REFERENCE TO RELATED APPLICATIONS

This application is a continuation of U.S. patent application Ser. No. 08/953,850 filed Oct. 15, 1997, which is a continuation-in-part of U.S. patent application Ser. No. 08/540,255 filed Oct. 6, 1995, now U.S. Pat. No. 5,591,001 issued Jan. 7, 1997, and also a continuation-in-part of PCT Application No. PCT/US96/15336 filed Sep. 24, 1996. All of the above patents and patent applications are hereby incorporated by reference.

FIELD OF THE INVENTION

This invention relates to a centrifugal pump for liquids, and more particularly to a pump which conditions the pumped liquid by introducing and dispersing a second fluid medium into the pumped liquid.

BACKGROUND OF THE INVENTION

Pumps have long been used to introduce and disperse air and other fluid media into a pumped liquid. For instance, pumps have been used for the production of an air and water mixture. The air so introduced facilitates the removal of oil and other pollutants including solid particles which tend to separate out as a surface scum with the introduction of air and liquid to the tank. The aerated liquid produced by the pump of course may be used for other purposes.

It is known in the art that aeration of liquids is a useful procedure relied upon in pollution control operations. A known procedure, by way of example, is the aeration of sewage contained in a holding tank, with such tending to produce separation of pollutants in the liquid in the tank either as a scum or as sediment. A convenient approach for introducing such air would be to introduce air in the desired quantity to the suction or intake side of the pump during a pumping operation, with the pump then tending to produce a mixture of air and liquid which is expelled from the pump. The problem with this approach is that the addition of significant quantities of air to the intake of the pump will cause the pump to lose outlet pressure and stop pumping. Pump performance is also affected. U.S. Pat. No. 3,663,117 to Warren discloses a so-called aeration pump, wherein air is introduced against the front side of a pump impeller in a centrifugal pump, with the impeller vanes therein then producing mixing of the air and liquid pumped to produce aeration of the liquid. Such a system, because of the relatively high pressure condition existing adjacent the periphery of the impeller, requires a source of air at superatmospheric pressure to be supplied to the pump chamber. In another system, the liquid discharged from a pump is supplied to an air saturation tank. This tank is also supplied air from a compressed air source, and the air and liquid are then mixed in the tank. The need for an air compressor and other equipment adds to the complexity and expense of any system requiring a source of pressurized air. All of these methods also only achieve a limited dispersion of the air into the water because of the limited mixing that can occur as they are passed through the pump.

It is also possible to utilize a pump to disperse other fluid, such as gases other than air or another liquid, into the pumpage. U.S. Pat. No. 4,744,722 to Sampi et al., for instance, describes a pump system for introducing liquid or gas into pulp stock. More generally, U.S. Pat. No. 3,948,492 to Hege discloses a system for mixing a second material into a first fluid material by use of a centrifugal impeller.

When introducing a second material into a pumped flow, one of the primary goals is obtaining a good dispersion of the introduced material into the pumped flow. With conventional systems, good dispersion is difficult to achieve because the added material is injected directly into the stream of the pumped liquid and is therefore rapidly carried out of the pump. Prior art systems often attempt to compensate for this deficiency by introducing the second material from a plurality of points. This method of addressing the problem, however, is of limited success and adds significantly to the complexity of the pump and injection system.

It is therefore an object of the present invention to provide a method and apparatus for finely dispersing a fluid material in a pumped liquid.

It is another object of this invention is to provide an improved method and apparatus for conditioning a liquid by the introduction of air into the liquid, with the air on introduction becoming dissolved in the liquid or entrained as a fine dispersion therein.

Another general object is to provide an improved sewage treatment method which utilizes recycled sewage conditioned with air in the treatment process.

Yet a further object is to provide an improved pump operable to produce a mixture of a pumped liquid and a second fluid.

A more specific object is the provision of such a pump, which employs air introduced into a seal chamber in the pump, and structure within the seal chamber producing an air liquid mixture which under the action of the pump impeller moves to the periphery of the impeller and then to the pump discharge.

BRIEF DESCRIPTION OF THE DRAWINGS

These and other objects and advantages are obtained by the invention, which is described herein below in conjunction with the accompanying drawings, wherein.

DETAILED DESCRIPTION OF THE PREFERRED EMBODIMENT

Figure 1:
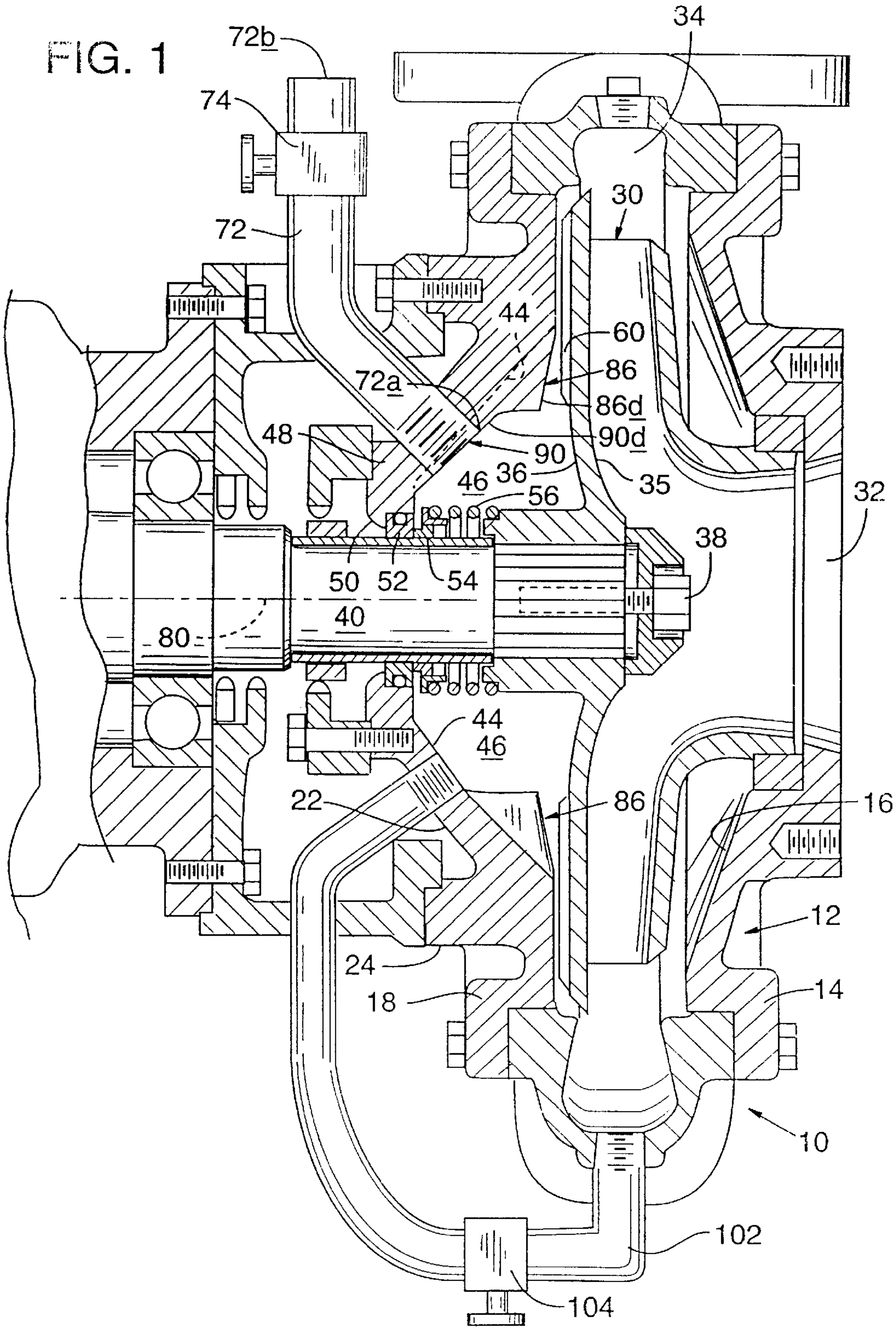
FIG. 1 is a cross sectional view of a centrifugal pump featuring a construction for a seal chamber in the pump as contemplated by the invention.

Referring now to the drawings, and first of all more particularly to FIG. 1, indicated generally at 10 is a centrifugal pump. The pump has a casing 12. Casing 12 includes a front casing section 14, with an internal pump chamber wall 16 defining a pump chamber having the usual volute configuration. Also part of the casing is a back casing section 18. These two casing sections are secured together in the pump. The back casing section includes a backplate portion 22 and a motor bracket portion 24.

A rotatable impeller 30 located within the pump chamber produces, on rotation, movement of the liquid being pumped or the pumpage. This liquid enters the pump chamber through an inlet opening or intake 32. Pressurized pumpage leaves the pump through pump discharge 34. The impeller has a front 35 and a back 36.

The impeller is detachably mounted, as by a fastener 38, on a forward end of a motor-driven impeller shaft 40. This shaft extends rearwardly, or outwardly from the back of the impeller, to a suitable power means such as an electric motor.

Backplate portion 22 has an inner wall 44, referred to as a seal chamber wall, which in general outline has a conical tapered or flaring shape. This wall and the back of the impeller bound what is referred to as a seal chamber or cavity 46. The seal chamber has a smaller diameter end located directly forwardly of a hub 48. By reason of the taper of the seal chamber wall, the seal chamber enlarges progressing from this end to the opposite or large diameter end of the seal chamber or from left to right in FIG. 1. This is only one type of seal chamber, others are possible.

Hub 48 extends about an opening 50 which receives the impeller shaft. Seal structure exposed to the seal chamber seals the shaft and casing, and this structure comprises a stationary seal 52 and a rotary seal 54 which rotates with the impeller shaft. A compression spring 56 urges the rotary seal against the stationary seal. With the construction described, liquid within the seal chamber is prevented from leaking outwardly past the backplate.

During operation of the pump, part of the liquid being pumped flows into the seal chamber by moving about the periphery of the impeller and across the impeller's outer back margin. It is conventional to utilize this circulating fluid to produce cooling of the seal structure just described.

The back of the impeller may be provided with backvanes indicated at 60. These vanes, when viewed in a direction extending toward the back of the impeller, ordinarily arcuately curve about the axis of the impeller shaft. By the inclusion of these vanes, a swirling action is introduced to the pumpage liquid which circulates in the seal chamber and the pressure in the seal chamber is reduced. Small vanes are often utilized on centrifugal pumps to slightly reduce pressure in the seal chamber to compensate for the axial thrust created on the impeller by the reduced pressure at the inlet to the pump. The backvanes of the present invention, however, are typically substantially larger and/or more numerous than necessary to compensate for the impeller thrust. In particular, the backvanes design should preferably be sufficient to create a subatmospheric pressure in the seal chamber. A number of factors affect the vacuum created in the seal chamber, including the number of backvanes, the backvane diameter and height, the clearance between the backvanes and the casing, the size of the seal chamber, the pump operating speed and the impeller vane outside diameter. Although creation of a sub-atmospheric pressure in the seal chamber is preferred, it is also possible to practice the present invention by introducing air or other fluid at a superatmospheric pressure as well. In this case, back vanes do not need to be designed to create a sub-atmospheric pressure in the seal chamber.

An air- or fluid-introduction passage is provided along the inside of a conduit 72 having one end 72*a* which opens to the seal chamber and an opposite end 72*b* which opens to the atmosphere. Indicated at 74 is an adjustable valve which can be adjusted to control the amount of air introduced to the seal chamber by the conduit. Preferably, the opening of the conduit into the seal chamber should be located above the horizontal centerline of the pump to prevent pumpage from leaking back out the conduit. It should be understood that while air is introduced in the preferred embodiment of a dissolved air floatation pump, no limitation should thereby be implied. In particular, it is possible to introduce any fluid substance, including air or other gases, as well as liquids and flowable solids or suspension, into a stream of pumpage utilizing the present invention.

Figure 5:
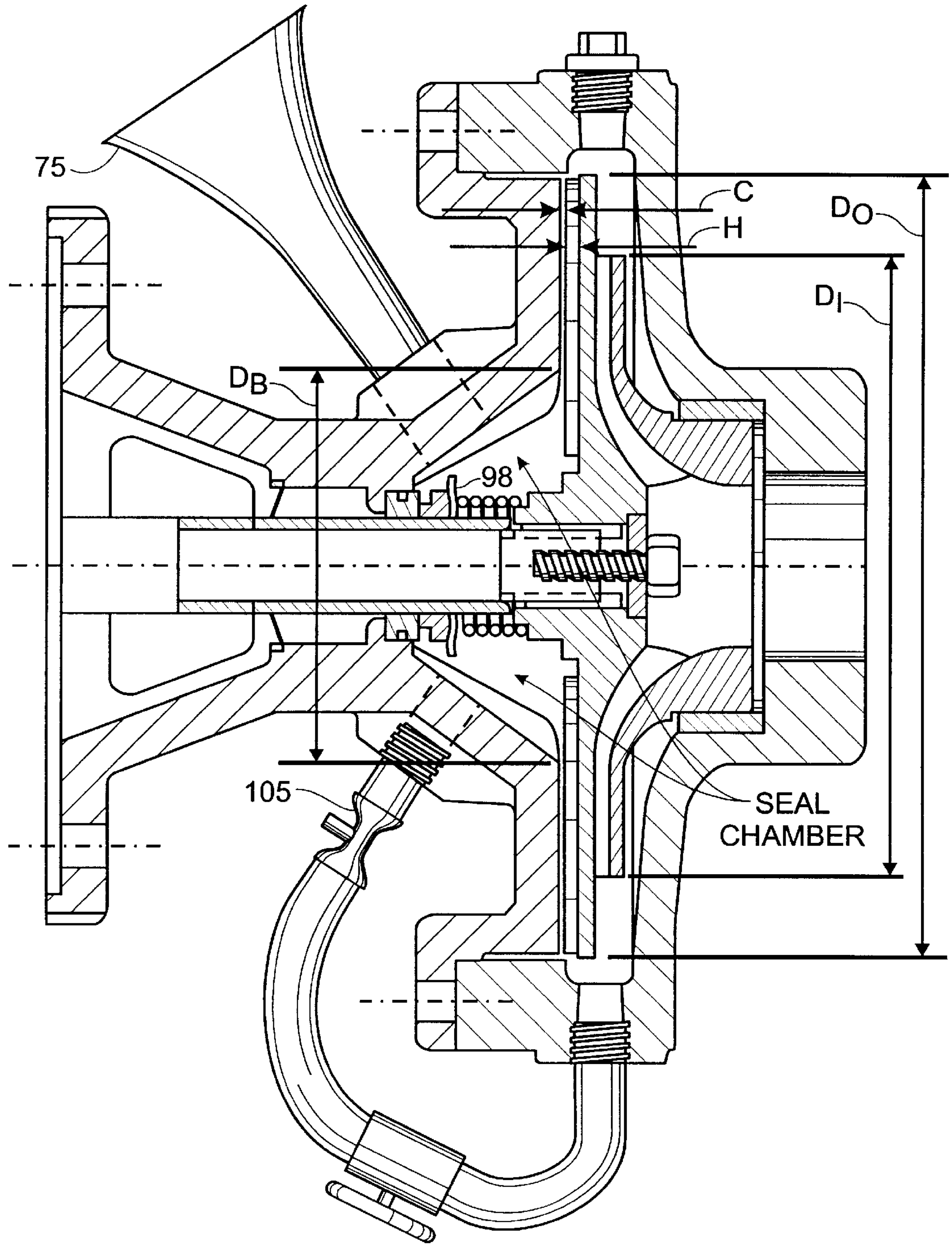
FIG. 5 is a cross-sectional view through an alternative embodiment of a pump construction according to the present invention.

During operation of the pump and rotation of the impeller, pumpage is drawn in through the suction of the pump 32 and discharged at the periphery of the impeller through discharge 34. A negative or subatmospheric pressure is produced in an annular region extending about the impeller shaft adjacent the seal structure for the shaft comprising stationary and rotary seals 52, 54. Spring 56 functions to keep the seal faces in engagement against the action of this negative pressure. The negative pressure is effective to draw atmospheric air into the seal chamber into the negative pressure region through air-introduction conduit 72, with the amount of such air being controllable through controlling the adjustment of valve 74 (or by using a properly sized orifice). As shown in FIG. 5, the air introduction conduit 72 may also be formed in the shape of a bell or venturi 75 to decrease the resistance to air flow and thereby increase the air draw of the pump.

Mixing of this air with the pumpage circulating at the rear of the impeller, and transporting of the mixture outwardly from the seal chamber to the stream of fluid being discharged from the pump at discharge 34, is promoted by agitation structure, which in the preferred embodiment, takes the form of stationary vane structure which is part of back casing section 18.

Figure 3:
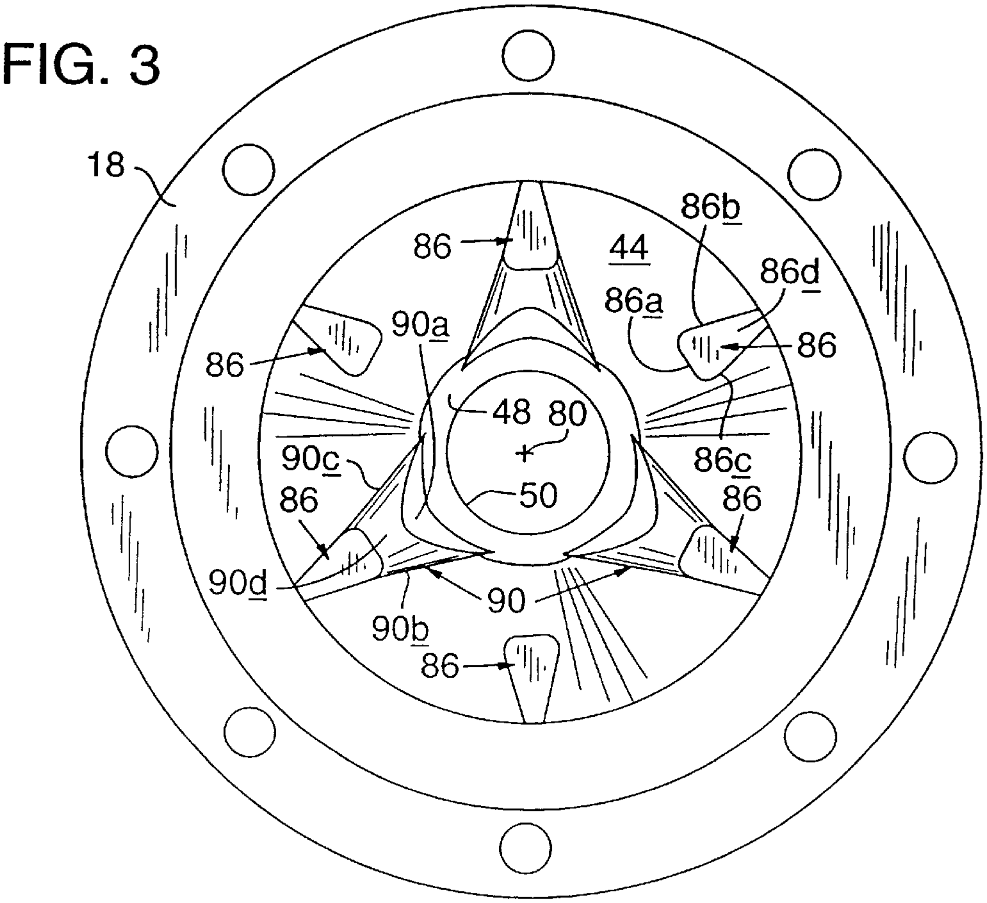
FIG. 3 is a view of the front of a backplate portion in the pump.

Further explaining, and referring also to FIG. 3, equally circumferentially distributed about an axis 80 of the impeller shaft are multiple (namely six in the embodiment of the invention illustrated) outer vane segments 86. In frontal outline, as illustrated in FIG. 3, each of these outer vane segments has a shape which roughly may be described as a truncated triangle, and includes a base 86*a* and opposite sides 86*b*, 86*c*. Each vane projects outwardly from the seal chamber wall with its front face 86*d* extending at only a slight angle relative to a plane perpendicular to the axis of the shaft compared to the slope of the inclined pump seal chamber wall, which extends at a greater angle with respect to this plane. By reason of this incline, each outer vane segment has an increasing height or greater projection from the inclined pump seal chamber wall progressing in a radially inward direction on the seal chamber. Explaining a typical construction, face 86*d* might extend at an angle of approximately 10° with respect to a plane perpendicular to the axis of the shaft. In comparison, the tapered seal chamber wall might extend at an angle of approximately 35° with respect to this perpendicular plane. These specific values herein are given only as exemplary, and are subject to variation depending upon pump construction.

Distributed circumferentially about the shaft axis are multiple (three in the embodiment shown) inner vane segments 90. These extend inwardly on the seal chamber wall from the inner ends of alternate ones of the outer vane segments. Each inner vane segment has an arcuate, concavely curving base 90*a*, and opposite sides 90*b*, 90*c*, with these sides forming extensions of sides 86*b*, 86*c* of an outer vane segment. Sides 90*b*, 90*c* diverge from each other progressing in a radially inward direction. A front face 90*d* of an inner vane segment (refer to FIG. 1) inclines away from the tapered seal chamber wall progressing in a radially outward direction. As a result, these inner vane segments have increasing height increasing radially outwardly on the seal chamber. With the seal chamber wall inclining at an angle of approximately 35° with respect to a plane extending perpendicular to the axis of the impeller shaft, the face of an inner vane segment might incline at a somewhat greater angle with respect to this plane, for example, an angle of 45°.

The sides of the outer vane segments need not join with the faces of these respective vane segments at a sharp angle, but over a slight round, which tends to reduce excessive turbulence in the circulation of pumpage moving over the vanes. As shown in FIG. 5, it is also possible to provide a corrugated ring or washer 98 to further improve mixing in the seal chamber. Washer 98 may have holes, ribs, splits, blades or other structures to increase turbulence and mixing in the seal chamber.

Figure 4:
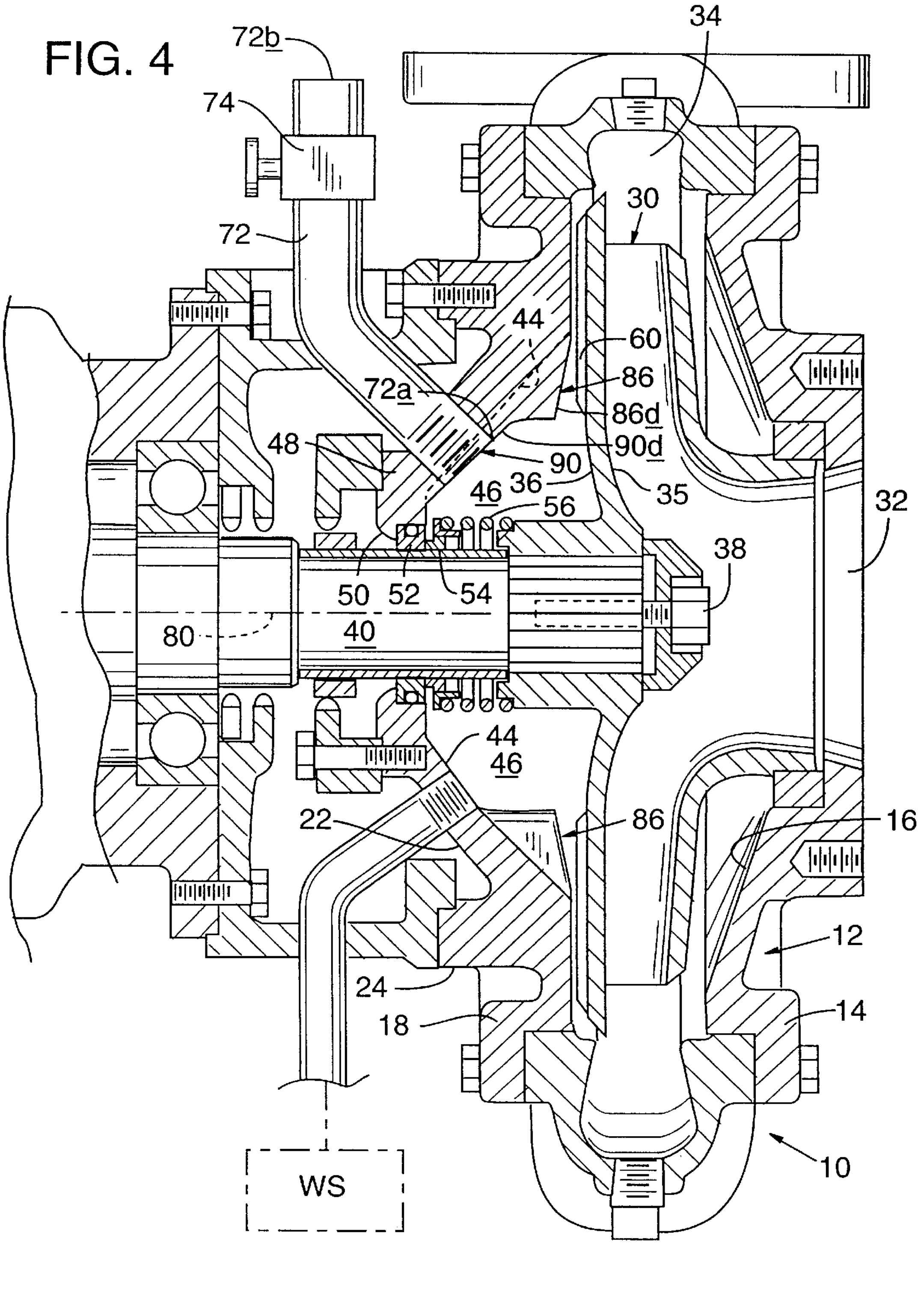
FIG. 4 is similar to FIG. 3 but illustrates a modification of the invention.

In the pump illustrated, a fluid circulation line or conduit is shown at 102, equipped with a valve 104. The conduit connects at one end with the interior of the pump casing at the periphery of the impeller. The opposite end connects with the seal chamber in the region of the seal chamber having a subatmospheric pressure. By including the circulation line, the amount of pumpage circulated to the seal chamber to be mixed with air may be increased over that which circulates to this seal chamber by moving over the periphery of the impeller. Optionally, liquid may be introduced to the seal chamber by a line connected to a pressurized water source. This is shown in FIG. 4 by the line connecting with the water source labeled "WS." Preferably, the circulation line should enter the seal chamber at the top vertical position to maximize the mixing of air and water. Operation of the circulation line serves to increase the amount of air that can be drawn in through air conduit 72. It is also possible to insert an eductor 105 into circulation line 102 and use the fluid flow to draw air through the eductor to thereby introduce a supply of air into the seal chamber.

Describing the operation of the pump, the vane structure on the back of the impeller together with the normal rotation of the impeller causes pumpage within the seal chamber to swirl about as the impeller rotates. As this pumpage moves over the stationary vane structure projecting from the rear wall of the seal chamber, a vortexing action results tending to move debris, and also mixed pumpage and air, from the region of the seal chamber adjacent the impeller shaft radially outwardly, with this fluid and debris ultimately being expelled from the seal chamber by way of the back vanes 60 to become intermixed with the principal pumpage being pumped by the pump which is being discharged at discharge 34. There is a turbulence in the fluid pumped and a complex mixing arising by reason of vortexing occurring at the periphery of the impeller which enables pump fluid to enter the seal chamber at the same time that fluid mixed with air exits the seal chamber.

As described above, numerous factors affect how much air or other fluid can be drawn into the seal chamber to mix with the pumpage. In general, the outside diameter of the seal chamber should be increased to handle larger volumes of air. Conversely, a smaller seal chamber diameter could be used where less air was to be introduced. However, because the volume of air can be adjusted with other parameters as well, the seal chamber is normally fixed for a given pump casing and the other parameter adjusted because of the complexity of changing the casting for the pump casing. For instance, the outside diameter of the impeller vanes may be reduced to reduce the pumpage flow rate and thereby increase the proportion of air introduced by maintaining all the other parameters constant. Decreasing the impeller vane diameter, because it reduces the pressure around the periphery of the impeller, tends to decrease the pressure in the seal chamber, thereby further increasing the volume of aspiration.

Generally speaking, increasing the number and size of the backvanes, or reducing their clearance, will increase the vacuum generated in the seal chamber. For simplicity of manufacturing, impeller vane and backvane outside diameters are the parameters usually used to control the pressure in the seal chamber. By way of example, for a dissolved air floatation process that required a pump output of 65 psi at 50 gallons per minute of flow rate while aspirating 0.6 scfm, a pump operating at 3525 rpm having a seal chamber outside diameter of 5.06 inches, a backvane height of 0.25 inches and a backvane clearance of 0.03 inches might be used. An impeller diameter of 5.62 inches would generate the required flow rate and a back vane diameter of 8.62 inches would create sufficient vacuum in the seal chamber to aspirated 0.6 scfm of air. If the desired flow rate were to increase to 80 gallons per minute at 65 psi and 0.88 scfm of air, the impeller dimension might be increased to 5.88 inches and backvane diameter increased to 9.0 inches.

Based on empirical testing it is believed that the following equation can be used to facilitate design of a pump which will function according to the present invention:

$$D_I^2/(D_O^2-D_B^2)<(1-C/H)*N^2/(1+N^2)$$

where $D_I$=Diameter of impeller vanes $D_O$=Outside diameter of backvanes $D_B$=Diameter of seal chamber H=Backvane height C=Backvane clearance N=Number of backvanes To first approximation, the right hand is approximately equal to one and therefore it can be generalized that $D_I^2/(D_O^2-D_B^2)$ should be less than one. More particularly, it is preferred that $D_I^2/(D_O^2-D_B^2)$ should be between 0.4 and 0.9 and most preferably between 0.7 and 0.9. The above equation may not apply if the material to be mixed in the pumpage stream were supplied under pressure rather than being drawn into the seal chamber.

Figure 2:
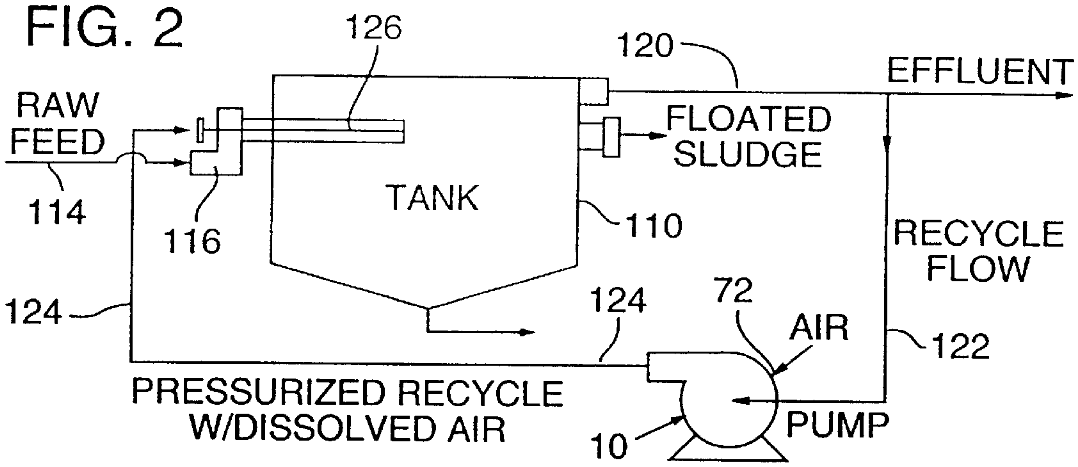
FIG. 2 is a schematic drawing illustrating a sewage treatment system utilizing a pump as described and shown in FIGS. 1 and 2.

A sewage system which utilizes the pump as described is illustrated in FIG. 2. Referring to this figure, a tank for containing a volume of sewage is illustrated at 110. Sewage is introduced to the tank from a raw sewage feed 114 introducing the sewage to the tank through a header box 116.

Effluent from the tank is removed through a conduit 120. A portion of this effluent is recycled through a conduit 122 to the intake of pump 10 above described. Fluid discharged from this pump travels through a conduit 124 to be returned to header box 116 and reintroduced to tank 110 through a conduit 126.

Air is introduced to the effluent through conduit 72.

Air introduced into the pump through operation of the impeller is thoroughly mixed with the liquid sewage. Much of the air is mixed to become dissolved in the liquid sewage. Air not actually dissolved is felt to be contained in the liquid in the air bubbles sized below 150 microns.

The introduction to the tank of the recycled stream of sewage containing dissolved air and air dispersed as finely entrained bubbles, has the effect, as earlier discussed, of producing a separation in the tank, with pollutants separating as a sludge which, if floating, can be removed from the tank as a drawoff.

The system in FIG. 2 can be further simplified by introducing the air into the pump supplying the raw feed, thus eliminating the need for a recycle flow, and further reducing the complexity of the system.

Figure 6:
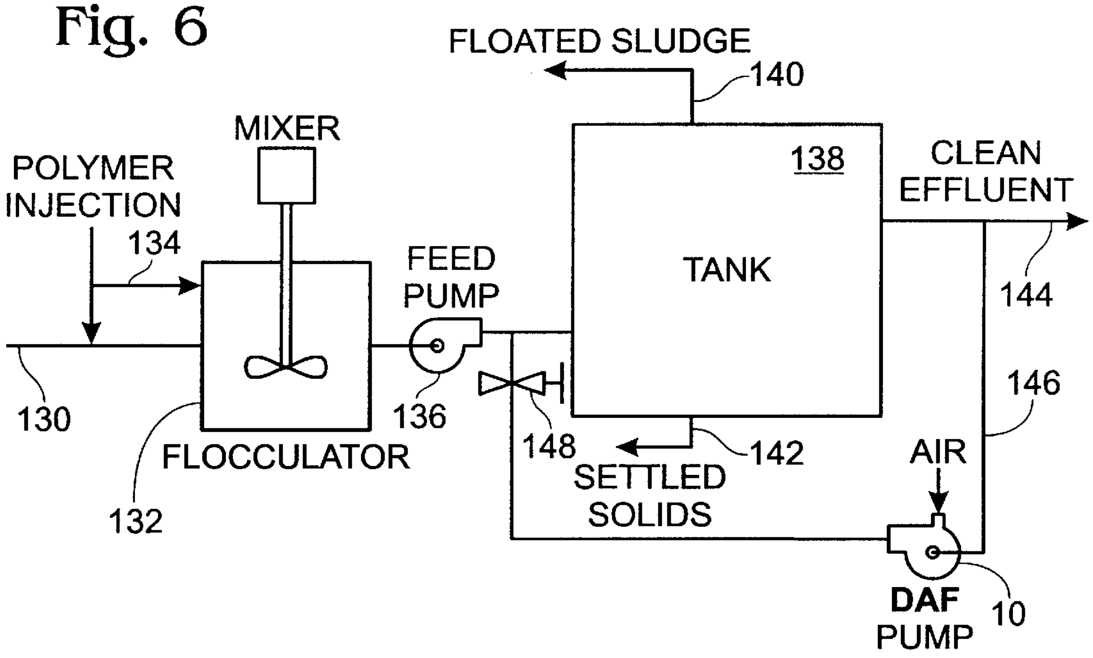
FIGS. 6 and 7 are alternate embodiments of a water treatment system according to the present invention.

FIG. 6 illustrates an alternative recycling treatment system utilizing a pump 10 according to the present invention. In particular, the recycling system includes input line 130 feeding waste to a flocculator 132. Flocculator 132 includes a mixer and a polymer input 134 is provided either directly into the flocculator or just upstream in the input line. After flocculation, a feed pump 136, or in gravity flow in some cases, transfers the waste stream into a settling tank 138. Tank 138 includes upper and lower waste remove ports 140, 142, respectively through which floated and settled solids may be removed. Tank 138 further includes a clean effluent output 144, which branches into a recycle line 146. The recycle line is fed through pump 10 where it is aerated and passed on back to the tank. A valve 148 regulates the return flow from the pump back into the tank. The present system eliminates the need for an air saturation tank that is normally required in the return line.

In some cases it may be desirable or beneficial to add flocculent or other chemicals, such as buffers, enzymes or pH modifiers, to the system in the recycle line rather than or in addition to the flocculator. In this case, the chemical could be introduced directly into DAF pump 10 or upstream or upstream of the pump in the recycle line. For instance, an additional port may be provided to the subatmospheric region behind the impeller to draw in the chemical. By introducing any such chemicals in or upstream from the DAF pump, passage of the chemical and waste stream through the pump enhances the mixing of the chemicals and the waste stream. This is particularly true where the chemical is introduced into the seal chamber.

Figure 7:
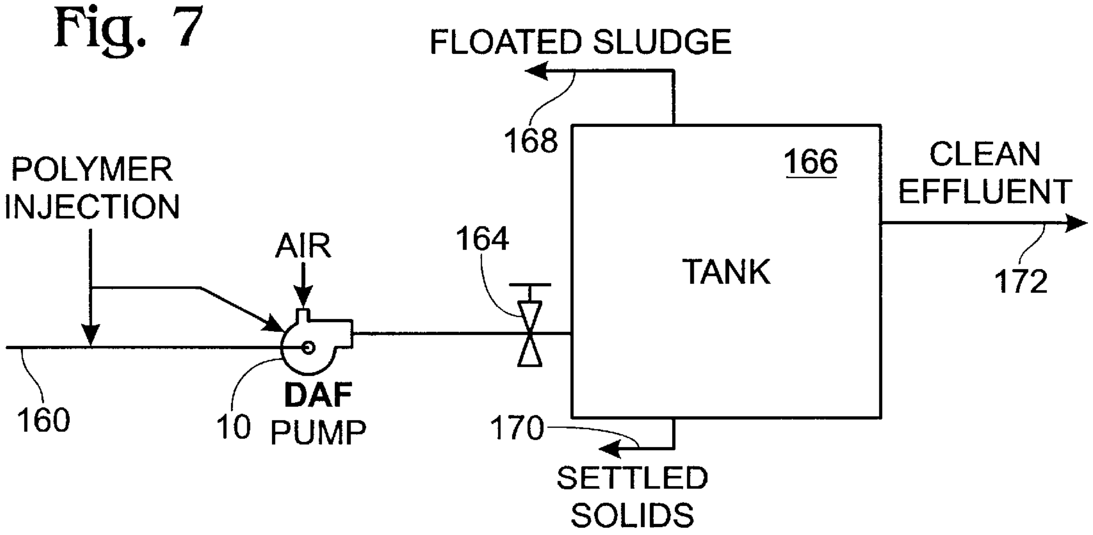

FIG. 7 illustrates a total pressurization treatment system utilizing a pump 10 constructed according to the present invention. This system includes an input line 160 which connects directly to the input of pump 10. A polymer input 162 is provided either upstream of the pump or into the seal chamber to allow delivery and mixing of polymer into the waste stream. If the polymer input is upstream of the pump, the polymer is mixed with the waste stream as both flow through the impeller. Alternatively, if the polymer is introduced into the seal chamber, it is mixed in with the air and water that are agitated in the seal chamber. This mixture is then introduced into the main flow around the periphery of the impeller. Flow proceeds from the pump through regulating valve 164 and into a settling tank 166. Settling tank 166 includes upper and lower waste removal ports 168, 170, respectively, through which floated and settled solids may be removed. Clean effluent is then discharged through an output port 172.

With the pump construction described, appreciable quantities of air may be introduced into the pumpage with introduction of air in an amount exceeding approximately 15% by volume of the pumpage handled having been attained. It is possible to further increase the amount of air introduced by utilizing a pressurized source of air. Because the power requirements for driving the pump drop somewhat with the introduction of additional air, it may be beneficial under some circumstances to attach a belt-driven compressor to the pump to supply additional air. With this structure, it may be possible to achieve a greater horsepower reduction in the pump than is required to operate the compressor, thereby increasing overall efficiency and the amount of air introduced. It is expected that introducing additional air, as with a compressor, may reduce the fineness of the dispersion achieved, which may not be desired under some circumstances.

More generally, a number of different variables affect efficient operation of a pump constructed according to the present invention. It is generally preferred that the discharge valve between the pump and the tank be located as close as possible to the tank so that the pumpage remains pressurized until entry into the tank. A valve in the suction piping can be used to regulate the pressure at the suction of the pump. Obstructions, such as flow meters or other devices, should be avoided in the discharge piping between the pump and the tank. Likewise, any changes in pipe diameter should occur gradually to avoid sudden transitions that may cause the microbubbles to come out of solution. Preferably, the discharge piping should be level or inclined upwardly toward the tank to avoid formation of an air bubble at the output of the pump. A stand pipe or other type of air collection device should be provided in the discharge piping to bleed of excess air that does not go into solution.

The discharge piping should be sized to provide a flow velocity of one to two feet per second. Moreover, the length of the discharge piping should provide about ten seconds of retention time from the discharge of the pump to the discharge valve. More or less length may be required depending on the process. Likewise, the velocity in the piping can be varied to achieve different results.

While an embodiment of the invention has been described, it is obvious that variations and modifications are possible without departing from the instant invention as claimed herein.

It is claimed and desired to secure by Letters Patent:

1. A dissolved gas floatation tank system comprising:

a tank;

an influent feed pipe adapted to deliver influent feed into the tank;

a waste output port adapted to carry waste from the tank;

an effluent output line to carry effluent from the tank;

a recirculation line extending from the tank to the influent feed pipe, the recirculation line being adapted to receive effluent from the tank for transport through the recirculation line;

a pump system in fluid communication with the recirculation line for dissolving gas into the effluent, the pump system including a centrifugal pump having an impeller with an eye and a volute; and said pump having a gas introduction port opening into a subatmospheric zone in to the pump for introducing gas directly into the pump, wherein said port opening and zone are away from the eye of the impeller.

2. The system of claim 1, wherein the pump is configured to produce a subatmospheric pressure region in a region adjacent the impeller opposite the eye during operation to draw gas into the pump for mixing with the effluent.

3. The system of claim 1, further including a chemical introduction port positioned to introduce a chemical into the influent feed prior to entry into the tank.

4. A system for dissolved air floatation treatment of an influent, comprising:

a tank adapted to receive the influent;

a recycle line connected to receive output from the tank and redirect that output back into the tank;

a pump disposed in the recycle line to pump output from the tank through the recycle line back to the tank, the pump including an impeller cavity and an impeller with an eye, where the pump is adapted to create a subatmospheric pressure zone in the cavity away from the eye and further includes an air introduction port opening into the subatmospheric zone to introduce significant quantities of air into the cavity for mixing with the output to facilitate dissolved air floatation treatment of the influent.

5. A system for dissolved air floatation treatment of a liquid stream, comprising:

a pump having an impeller cavity with input and output ports, and an impeller with an eye disposed adjacent the input port, the impeller drawing liquid through the input port and driving the liquid toward the output port upon operation and further creating a subatmospheric pressure zone in the cavity away from the eye upon operation, the pump further including an air introduction port opening into the subatmospheric zone to introduce significant quantities of air into the cavity for mixing with the liquid stream; and a tank adapted to receive the liquid stream from the pump with dissolved air introduced therein.

6. The system of claim 5, further including a recycle line connecting an output port of the tank to the input port of the pump, where the recycle line carries liquid from the tank to the pump.

7. The system of claim 6, further including an influent line to deliver an influent liquid to the tank.

8. The system of claim 7, further including a header to receive the influent liquid prior to introduction into the tank, where the output port of the pump is connected to the header to receive the liquid stream from the pump with dissolved air introduced therein for mixing with the influent liquid prior to introduction of the liquids into the tank.

9. The system of claim 8, further including a chemical input port connected to the header for introducing a chemical into the header.

10. The system of claim 7, further including a flocculator disposed in the influent line to mix a flocculant into the influent liquid prior to the tank.

11. The system of claim 5, further including an influent line to deliver an influent liquid to the input port of the pump.

12. The system of claim 5, wherein the pump includes a chemical injection port through which a treatment chemical can be introduced and mixed into the liquid stream.

13. The system of claim 5, wherein a conduit system delivers liquid to the input port of the pump and the conduit system includes a chemical injection port through which a treatment chemical can be introduced into the liquid prior to the pump.

* * * * *

UNITED STATES PATENT AND TRADEMARK OFFICE

CERTIFICATE OF CORRECTION

PATENT NO. : 6,074,554

DATED : June 13, 2000

INVENTOR(S) : Robert B. Ray, Mark M. Wandil and Gary L. Olin

It is certified that error appears in the above-indentified patent and that said Letters Patent is hereby corrected as shown below:

On the cover page of the patent:

In section [75], line 2, please replace "Oandil" with --Qandil--.

Signed and Sealed this

Twenty-fourth Day of April, 2001

Attest:

NICHOLAS P. GODICI

*Attesting Officer* *Acting Director of the United States Patent and Trademark Office*